Patented Sept. 27, 1932

1,879,028

UNITED STATES PATENT OFFICE

WILHELM BAUER, JOSEF HALLER, AND LUDWIG ZEH, OF WIESDORF-ON-THE-RHINE, GERMANY, ASSIGNORS TO GENERAL ANILINE WORKS, INC., OF NEW YORK, N. Y., A CORPORATION OF DELAWARE

NEW WATER SOLUBLE SULFURIC ACID ESTERS OF LEUCO DERIVATIVES OF INDIGOID VAT DYESTUFFS

No Drawing. Application filed April 13, 1931, Serial No. 529,891, and in Germany April 23, 1930.

The present invention relates to new water-soluble sulfuric acid esters of leuco derivatives of indigoid vat dyestuffs containing nitro groups and to the dyeings and printings obtainable by means of said esters.

In accordance with the present invention sulfuric acid esters of leuco derivatives of indigoid vat dyestuffs containing nitro groups are prepared, which esters have affinity to animal and vegetable fibers and can be developed on the fiber to yield the dyeings of indigoid vat dyestuffs containing nitro groups.

The manufacture of our new sulfuric acid esters may be performed according to various methods. For example, the indigoid vat dyestuffs containing nitro groups may be treated with a metal, especially a heavy metal, such as copper, zinc, iron etc. in the presence of a tertiary organic base, such as pyridine, homologues thereof, quinoline, dimethylaniline, hexahydrodimethylaniline etc., while leading sulfur trioxide through the reaction mixture, or while adding a reagent containing sulfur trioxide or being able to split off sulphur trioxide under the conditions of working, such as fuming sulfuric acid, chlorosulfonic acid, chlorosulfonic acid esters etc. Suitable organic solvents being inert to the starting materials, such as chlorobenzene, ortho-dichlorobenzene, etc. may be added to the reaction mixture. The reaction may be performed at normal or elevated temperature, say, for example, at a temperature between about 10 and about 100° C., while applying about 5 to about 10 parts by weight of the heavy metal upon 10 parts by weight of the starting dyestuff and more than two molecular proportions of sulfur trioxide or of the agent containing sulfur trioxide, or being able to split off the latter (calculated on the sulfur trioxide available) upon one molecular proportion of the starting dyestuff. The amount of the tertiary organic base applied may be varied in wide limits. When working without the addition of a solvent inert to the starting material, we prefer to apply the base in an amount sufficient to allow a good stirring of the reaction mixture, for example, 5–10 parts by weight on one part by weight of the starting dyestuff. However, it may be mentioned that a great part of the base may be replaced by an organic solvent being inert to the starting materials, as mentioned above.

According to another feature of the invention the sulfuric acid esters of the leuco derivatives of the indigoid vat dyestuffs are prepared as described in application for Letters Patent Serial No. 529,892 of even date, that is by reducing indigoid vat dyestuffs by means of hydrogen sulfide in the presence of a tertiary organic base, especially a tertiary heterocyclic base or a hydrogenation product of a tertiary isocyclic organic base, at normal or slightly elevated temperature, and by esterifying the leuco derivative thus obtainable with sulfur trioxide or an agent containing sulfur trioxide or being able to split off the latter under the conditions of working, in the presence of a tertiary organic base. Obviously, the reaction may likewise be performed by simultaneously reacting upon the indigoid vat dyestuff with a mixture of a base of the kind above referred to, sulfur trioxide or an agent containing sulfur trioxide or being able to split off the latter under the conditions of working, and of hydrogen sulfide, the reaction being performed in the same manner as described in the co-pending application Serial No. 529,892 of even date.

A third method of preparing the sulfuric acid esters in question is as follows:—

The indigoid vat dyestuffs are reduced to the corresponding leuco derivatives by means of sulfurous acid in the presence of formic acid and of a tertiary organic base, such as pyridine, a homologue thereof, quinoline etc. as described in German Patent 489 725. The leuco derivatives thus obtainable are then transformed into the sulfuric acid esters as described for the other methods mentioned before.

It should be mentioned that in all the methods described above, the presence of water and air (oxygen) should be avoided as far as possible.

The sulfuric acid esters thus obtainable most probably contained in their free form the grouping:—

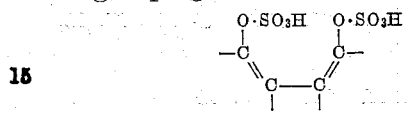

They are, especially in the form of their alkali metal or ammonium salts, easily soluble in water. They are nearly colorless or colored compounds (generally weakly greyish or yellow to yellowish-red or black) and are reduced without saponification to the corresponding amino esters of the indigoid dyestuffs by treatment with alkaline reducing agents, for example, sodium hydrosulfite and a dilute aqueous caustic soda solution. By oxidizing agents in an acid medium, for example, by an aqueous ferric chloride/hydrochloric acid solution or an aqueous alkali metal nitrite/hydrochloric acid solution, the esters are saponified with the formation of the starting dyestuffs.

The new esters can be used for dyeing or printing purposes in the manner known for dyeing and printing with water-soluble sulfuric acid esters of vat dyestuffs. For example, they are dissolved in water, sulfuric acid or acetic acid is added, wool is dyed in this bath and the dyeings are developed by treating the wool with a dilute mineral acid (sulfuric acid, for example) in the presence of sodium nitrite or sodium bichromate.

Otherwise, wool or cotton may be printed with a printing paste containing a water-soluble salt of the sulfuric acid ester and an alkali metal or ammonium nitrite, whereafter the printings are developed in the usual manner in a mineral acid bath. Likewise, cotton may be printed with a printing paste comprising, besides a water-soluble salt of the sulfuric acid ester of the leuco indigoid vat dyestuff, ammonium thiocyanate or diethyltartrate, sodium chlorate and ammonium vanadinate. The printings are then steamed and soaped at the boil. The dyeings or printings thus obtainable are those corresponding to the starting dyestuffs containing free nitro groups.

The following examples illustrate our invention, without, however, restricting it thereto, the parts being by weight:—

*Example 1*

Into 200 parts of anhydrous pyridine 40 parts of chlorosulfonic acid methyl ester are caused to run in slowly at a temperature of about 5–10° C., while stirring. After that, a mixture of 13 parts of copper powder and 20 parts of the dyestuff, obtainable by condensing a reactive alpha-derivative of 5-nitroisatine with 1.2-naphtho-oxythiophene, are introduced at the same temperature. The reaction mixture is stirred for about 3–4 hours at about 25° C. while excluding air, until the dyestuff has dissolved. Then the reaction mixture is poured into ice water, whereupon the pyridine salt of the ester separates. It is filtered, dissolved in water with the addition of potassium carbonate, the solution is filtered and salted out with potassium carbonate. An orange colored crystalline powder is thus obtained, easily soluble in water. When treating the aqueous solution with acid oxidizing agents, for example, ferric chloride/hydrochloric acid, the starting dyestuff is recovered. The new ester, which most probably corresponds in its free form to the formula:—

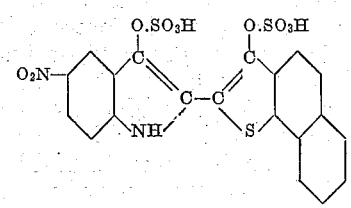

dyes wool from an acid bath orange shades, which on treatment with acid oxidizing agents are converted into a corinth of good fastness properties. Likewise, the ester may be applied for cotton printing purposes, yielding after oxidation corinth shades of good fastness properties, particularly to chlorine, light and washing.

When reducing the ester in an alkaline medium, for example, with sodium hydrosulfite in aqueous caustic soda solution, the corresponding amino leuco ester is obtained in form of a light grey powder, yielding on oxidation with acid oxidizing agents a blackish-green amino compound.

*Example 2*

60 parts of chlorosulfonic acid methyl ester are introduced while stirring into 100 parts of anhydrous pyridine and 500 parts of chlorobenzene at a temperature of 5–10° C. After replacing the air contained in the reaction vessel by carbon dioxide, 30 parts of 7.7'-dinitrothioindigo (orange-brown powder, dissolving in strong sulfuric acid with a violet coloration) and 21 parts of copper powder are added and the reaction mixture is stirred for about 3 hours, while leading carbon dioxide through the mixture and causing the temperature to rise slowly to about 35–40° C. The reaction mixture is filtered with suction and the residue washed with benzene. Then the residue is extracted with hot dilute aqueous sodium carbonate solution. After cooling, the sodium salt of the ester formed precipitates in the form of dark crystals having metallic luster. It most probably corresponds to the formula:—

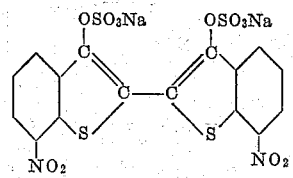

The ester contains two nitro groups and can be retransformed to 7.7′-dinitrothioindigo by means of acid oxidizing agents.

*Example 3*

40 parts of the dyestuff, obtainable by reacting upon 5-nitro-6.9-dichloro-1.2-naphthisatine chloride with 2.1-naphtho-oxythiophene, are finely powdered, mixed with 26 parts of copper powder and the mixture is introduced at about 15° C. into a solution of 50 parts of sulfur trioxide in 400 parts of anhydrous pyridine. The reaction mixture is stirred at about 25° C. for about 3 hours while excluding air. The ester is isolated as described in Example 1. It most probably corresponds in its free form to the formula:—

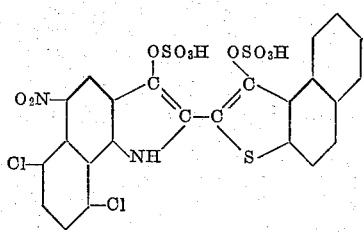

The 5-nitro-6.9-dichloro-1.2-naphthisatine, the chloride of which is applied in this example, can be obtained by reacting with concentrated nitric acid upon 6.9-dichloro-1.2-naphthisatine. It crystallizes from glacial acetic acid in the form of red needles, melting above 280° C.

*Example 4*

55 parts of chlorosulfonic acid are introduced into 300 parts of anhydrous pyridine, to which mixture 30 parts of the dyestuff, obtainable by reacting upon the condensation product of 2.1-naphtho-oxythiophene and para-nitrosodimethylaniline with 5-nitro-oxythionaphthene, and 20 parts of copper powder are added. The mixture is stirred for one hour at room temperature and then two hours at 30–35° C. while excluding air. After that, the mixture is poured into water and the ester isolated in the form of its potassium salt by salting out. It forms a weakly olive-green colored powder which color changes to a reddish-brown when oxidized with acid oxidizing agents in substance or on the fiber. The ester corresponds in its free form most probably to the formula:—

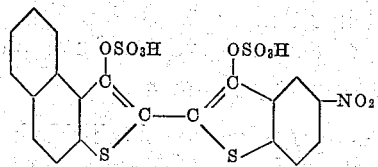

5-nitro-oxythionaphthene, applied for the manufacture of the starting dyestuff, is obtainable by substituting the chloro atom of 5-nitro-2-chlorobenzene-1-carboxylic acid by the radical of thioglycollic acid, treating the reaction product with acetic anhydride and splitting off the acetyl group. 5-nitro-oxythionaphthene crystallizes from alcohol in weakly yellowish colored leaflets, melting at 125° C.

*Example 5*

Sulfur dioxide is passed at 5–10° C. into 100 parts of anhydrous pyridine, until the increase of weight amounts to ten parts. 2.5 parts of formic acid are added, and, furthermore, 10 parts of the finely powdered dyestuff, obtainable by reacting upon 5-nitro-isatine-alpha-chloride with 6.7-benzo-(Bz-4-chloro)-oxythionaphthene. The air in the reaction vessel is then replaced by carbon dioxide and the reaction mixture stirred for half an hour at a temperature of 60° C., whereupon a clear yellowish-brown solution is formed. This solution is poured, while excluding air, into a mixture, obtained by slowly introducing 20 parts of chlorosulfonic acid into 100 parts of pyridine. The temperature rises to about 30° C., and the reaction mixture is kept at this temperature for about 2 hours. After that, the reaction mixture is poured into 200 parts of water, 40 parts of sodium carbonate are added, and the pyridine is removed by steam distillation. The resulting yellowish-red solution is filtered and the sodium salt of the ester formed salted out by means of sodium chloride. It forms an olive colored powder, easily soluble in water with a yellow coloration and behaves towards oxidizing and reducing agents in the same manner as the product of Example 1. The new ester corresponds in its free form to the probable formula:—

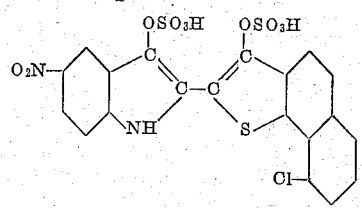

*Example 6*

10 parts of the dyestuff of Example 5 are reduced as described in Example 5, and to the mixture thus obtained 18 parts of chlorosulfonic acid methyl ester are slowly added at a temperature of −10 to −8° C. Then the temperature is slowly raised to 25-30° C., and the reaction mixture worked up as described in Example 5. The product thus obtained is identical to that of Example 5.

*Example 7*

15 parts of the dyestuff obtainable by coupling 5-nitro-6.7-benzo-(Bz -4 -chloro)-isatinealphachloride with 4.5-benzo-oxythionaphthene are introduced into 150 parts of anhydrous pyridine, containing 15 parts of sulfurous acid. The mixture is then heated to 50-60° C., after which 4 parts of formic acid are stirred in slowly. The dyestuff dissolves with the yellow coloration of its leuco derivative. The reaction mixture is further stirred for half an hour at 60° C. while excluding air, and then poured into a mixture of 100 parts of anhydrous pyridine and 25 parts of chlorosulfonic acid methyl ester. During esterification the temperature is kept at 25-30° C., and then the reaction mixture is poured into dilute caustic soda solution. The pyridine is distilled off by steam distillation, and the sodium salt of the leuco sulfuric acid ester formed is salted out by means of sodium chloride. It most probably corresponds to the formula:—

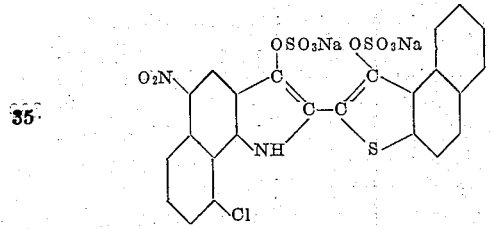

It forms a yellowish-brown powder, yielding, when used for dyeing or printing purposes, after oxidation with acid oxidizing agents a greenish black shade of good fastness properties.

*Example 8*

20 parts of sulfur dioxide are introduced into 200 parts of anhydrous pyridine, while cooling with ice. To this solution 5 parts of formic acid and 20 parts of the dyestuff, obtainable by coupling 5-nitroisatine chloride with 4-chloro-1-naphthol, are added. The temperature is raised to 60° C., until the dyestuff has dissolved with a yellow coloration. After cooling to −10 to −5° C., 40 parts of chlorosulfonic acid are added and the temperature is raised to 35-40° C. After about one hour the reaction mixture is worked up in the usual manner, and the sodium salt of the leuco ester formed is isolated as described before. It forms a yellowish colored crystalline powder, easily soluble in water, being split up to the starting dyestuff by means of acid oxidizing agents. The new ester corresponds in its free form most probably to the formula:—

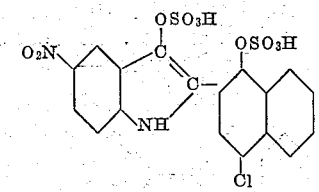

*Example 9*

30 parts of the vat dyestuff, obtainable by the action of 5-nitro-isatine-chloride on 2.1-naphtho-oxythiophene, are stirred in the form of a fine powder into 300 parts of anhydrous pyridine. Anhydrous hydrogen sulfide is passed into this suspension at the ordinary temperature, until the dyestuff has completely dissolved in the form of the leuco compound. The excess of hydrogen sulfide is then displaced by carbon dioxide, and the solution is introduced, while excluding air, into an esterification mixture consisting of 200 parts of pyridine and 60 parts of chlorosulfonic acid, produced at 5-10° C. While continuing the passing through of carbon dioxide, the mixture is stirred at a temperature of about 30° C., until the esterification is complete. It is then poured into ice water, 50 parts of caustic soda solution of 33% strength and an excess of sodium carbonate are added, and the pyridine is distilled off by means of steam. The remaining yellowish-brown solution is filtered, and the sodium salt of the ester separated by the addition of sodium chloride. The ester corresponds in its free form to the probable formula:—

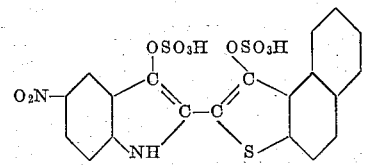

It is a yellowish-brown powder, which dissolves in water with a yellow coloration. On treatment with mineral acids in the presence of an oxidizing agent, the original dyestuff, a brown with a violet tinge, is recovered. The nitro group has accordingly been retained. When sodium hydrosulfite is caused to act on the sodium salt of the ester in alkaline solution, reduction of the nitro group to the amino group occurs, the color becoming lighter. The reaction product can be isolated by salting out in the form of a yellowish colored powder. On decomposition and oxidation, for example, with sulfuric acid and potassium dichromate, it yields a greenish-black.

*Example 10*

390 parts of 7.7'-dinitrothioindigo are stirred with a freshly produced ice cold solution of 68 parts of hydrogen sulfide in 1100 parts of anhydrous pyridine, first at 5-10° C.

and then at room temperature, until a yellowish-brown solution results, from which the dark colored leuco compound of the dinitro-thioindigo has in part separated. The reaction mass is then stirred at ordinary temperature and with the exclusion of air into an esterifying mixture consisting of 400 parts of chlorosulfonic acid and 2000 parts of pyridine. The chlorosulfonic acid may be replaced in this example by the same quantity of chlorosulfonic acid methyl ester.

The reaction mixture is worked up in the customary manner. The sodium salt of the 7.7'-dinitro-thioindigo-leuco sulfuric acid ester of the probable formula:—

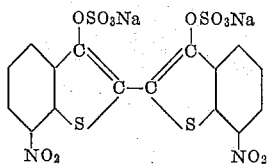

crystallizes from water in yellowish-brown leaflets and, on treatment with dilute mineral acids in the presence of an oxidizing agent and with the application of heat, reforms the orange colored 7.7'-dinitro-dithioindigo.

*Example 11*

100 parts of the finely powdered vat dyestuff, obtainable by the action of a reactive alpha-derivative of 5-nitro-6.7-benzo-(Bz-1.4-dichloro)-isatine (prepared by treating 6.7-benzo(Bz-1.4-dichloro)-isatine with an excess of concentrated nitric acid at ordinary temperature) on 4.5-benzo-hydroxythionaphthene, are introduced at 5–10° C. into an esterification mixture consisting of 200 parts of chlorosulfonic acid and 1000 parts of pyridine. Anhydrous hydrogen sulfide is then led in at the same temperature. After about one hour, the dyestuff has passed into solution in the form of its leuco compound. The supply of hydrogen sulfide is then reduced and the temperature raised to 20–25° C., until a test portion no longer oxidizes in the air in alkaline solution. The whole is then poured into much ice water and left to stand for some time, until the pyridine compound of the ester has settled. This compound is isolated and converted into the sodium salt by reaction with caustic soda in the manner already described.

The compound thus obtainable corresponds most probably to the formula:

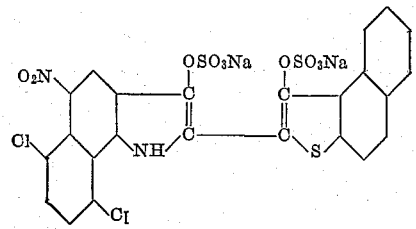

The following table shows some of the leuco esters we have prepared and the shades of the dyeings or printings obtainable by means of said esters.

| Leuco ester of | Shades of dyeings |
|---|---|
| 5.5'-dibromo-7.7'-dinitroindigo | Greenish-black |
| The dyestuff obtainable from 5-bromo-7-nitroisatine chloride + 2.1-naphtho-oxythiophene | Brown |
| The dyestuff obtainable from 5-bromo,7-nitroisatine chloride + alpha-anthrol | Black |
| The dyestuff obtainable from 5-bromo-7-nitroisatine chloride + 1-chloro-2.3-naphtho-oxythiophene | Steel-blue |
| The dyestuff obtainable from 5-bromo-7-nitroisatine chloride + 4.7-dimethyl-5-chloro-oxythionaphthene | Blackish-violet |
| The dyestuff obtainable from 5-nitro-9-chloro-1.2-naphthisatine chloride + 2.1-naphtho-oxythiophene | Brownish-black |
| 5.5'-dichloro-7.7'-dinitrothio-indigo | Orange |
| The dyestuff obtainable from 5.7-dichloroisatine chloride + 5-nitro-oxythionaphthene | Violet |
| The dyestuff obtainable from 6-methoxy-oxythionaphthene-alpha-4'-dimethylamidoanil + 5-nitro-oxythionaphthene | Orange |
| The dyestuff obtainable from 5-nitroisatine chloride + nitro-oxythionaphthene | Reddish-violet |
| The dyestuff obtainable from 8-chloro-1.2-naphthisatine chloride + 5-nitro-oxythionaphthene | Reddish-black |
| The dyestuff obtainable from 2.1-naphthisatine chloride + 5-nitro-oxythionaphthene | Corinth |

5.5'-dibromo-7.7'-dinitroindigo, which has been unknown up-to-date is prepared by treating 5-bromo-7-nitroisatine-alpha-chloride with hydrogen sulfide in chlorobenzene.

We claim:—

1. The new sulfuric acid esters of leuco derivatives of indigoid vat dyestuffs containing nitro groups bound to an aromatic nucleus, said esters possessing in their free form the characteristic grouping:—

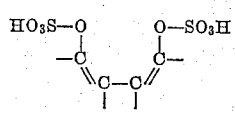

forming colored compounds easily soluble in water, particularly in the form of their alkali metal or ammonium salts, being split up by acid oxidizing agents to the starting indigoid dyestuffs contaning nitro groups, being reduced by alkaline reducing agents with the formation of the sulfuric acid esters of the corresponding indigoid dyestuffs containing amino groups, and being valuable media for dyeing and printing purposes.

2. The new sulfuric acid ester having in its free form the probable formula:—

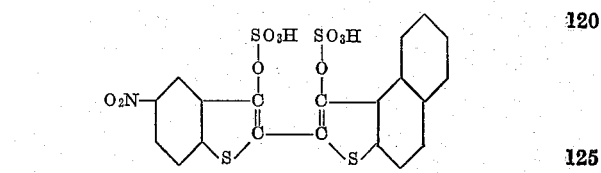

said ester being in the form of its alkali metal salts a weakly olive-green powder, easily soluble in water, and being a valuable product for dyeing and printing purposes.

3. The new sulfuric acid ester having in its free form the probable formula:—
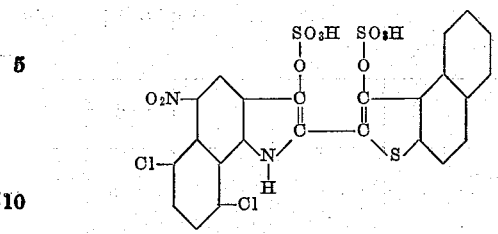
said ester being in the form of its alkali metal salts an orange powder, easily soluble in water and being a valuable product for dyeing and printing purposes.
In testimony whereof, we affix our signatures.
WILHELM BAUER.
JOSEF HALLER.
LUDWIG ZEH.